Oct. 14, 1952     R. H. J. CARY     2,614,219
AERIAL SYSTEM

Filed March 14, 1949     2 SHEETS—SHEET 1

R. H. J. CARY
Inventor

By Moore and Hall
Attorneys

Oct. 14, 1952     R. H. J. CARY     2,614,219
AERIAL SYSTEM

Filed March 14, 1949     2 SHEETS—SHEET 2

R.H.J. CARY
Inventor

Patented Oct. 14, 1952

2,614,219

UNITED STATES PATENT OFFICE 2,614,219

AERIAL SYSTEM

Rex Henry John Cary, Great Malvern, England, assignor to the Minister of Supply in His Majesty's Government of the United Kingdom of Great Britain and Northern Ireland Application March 14, 1949, Serial No. 81,301
In Great Britain September 30, 1947

22 Claims. (Cl. 250—33)

The present invention relates to transmitting and receiving antennae for aircraft.

External wire antennae such as have been used on aircraft for frequencies below, for example, some 20 mc./s. are unsatisfactory for use on fast aircraft, because of the drag which they impose; indeed, when the aircraft speed is very high, no kind of external antenna system can be tolerated, and what is known as a suppressed antenna system must be used. An antenna is said to be suppressed when the modification, due to its presence, in any of the aircraft profiles is negligible.

Slot radiators have been proposed as suppressed antennae, but below a limited frequency, or for other reasons, the installation of a slot antenna may not be feasible.

It is, therefore, an object of this invention to provide a suppressed antenna suitable for use at frequencies, or in circumstances, which render a slot antenna unsuitable.

A further object of the invention is to provide a suppressed antenna for aircraft in which a part of the structure of the aircraft is employed as one arm of a folded unipole antenna.

Another object is to provide a folded unipole antenna on an aircraft, the antenna presenting no parts external to the aerodynamic profile of the craft and having a desired direction of polarisation.

Yet another object of the invention is to provide a suppressed folded unipole antenna for an aircraft, in which one arm is formed by a structural part of the aircraft electrically connected at one end to the main body of the aircraft, which may be regarded as "ground."

According to the invention, an aircraft has a metallic portion of its structure arranged as the grounded arm of a folded unipole antenna.

According to a feature of the invention, an aircraft or a section thereof, has a metallic portion of its structure arranged as the grounded arm of a folded unipole antenna, the fed arm of which is constituted by a separate conducting element which is suppressed to conform to the surface of the structure.

According to a further feature of the invention an aircraft or a section thereof has a first metallic portion of its structure arranged as the grounded arm of a folded unipole antenna, the fed arm of which is constituted by a further metallic portion of the structure which is located adjacent to said first portion but is electrically isolated therefrom over a substantial fraction of its length.

Parts of the structure most suitable to constitute the grounded arm of a folded unipole are associated with those extremities of the aircraft, which, in the aerodynamic sense, are sharply pointed; for example, the antenna is conveniently located in the tail fin (vertical polarisation) or at a wing-tip (horizontal polarisation).

The invention may be more clearly understood from the following description given with reference to the accompanying drawings, in which.

Figures 1, 2:
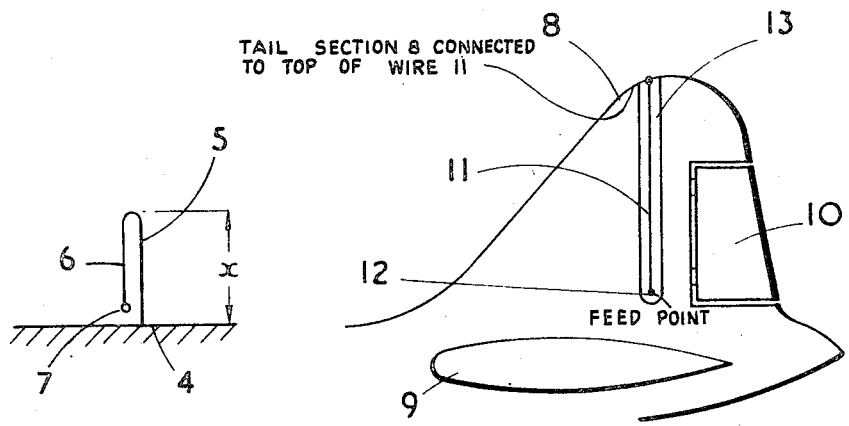
Fig. 1 is a diagrammatic equivalent electrical circuit of a folded unipole antenna.
Fig. 2 is a diagrammatic elevation view of a tail portion of an aircraft incorporating an antenna constructed according to the invention.

Fig. 1 illustrates the essential elements of a folded unipole; in Fig. 1, 4 represents an earth counterpoise (such as the metal fuselage of an aircraft) and 5 and 6 are the grounded and fed arms respectively of the unipole; the feed point is indicated at 7. The antenna is most efficient when the dimension $x$ is close to one quarter wavelength, but it may be more or less than the optimum provided suitable means are provided for matching and tuning.

Figure 4:
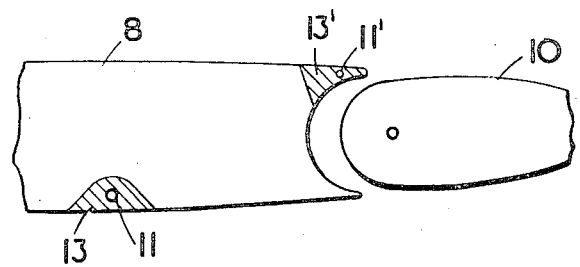
Fig. 4 is a diagrammatic view of a horizontal cross-section of the tail fin and rudder of the embodiment of the invention shown in Fig. 2.

One type of embodiment of the invention applied to the tail structure of an aircraft is illustrated in various forms in Figs. 2, 4 and 5.

Referring to Fig. 2, the grounded arm of a folded unipole is constituted by the upper portion of the tail fin 8 of a metal-skinned aircraft, the tail plane and rudder being indicated at 9 and 10 respectively. The fed arm is constituted by an insulated wire 11, which emerges from the skin at the point 12 (being joined inside the skin to a suitable feeder by means of a matching unit) and which is joined electrically to the skin at or close to the tip of the tail fin. The wire 11 runs in a semi-cylindrical recess 13 in the skin, and the recess is filled with insulating material so that the shape of the tail-fin surface is preserved. The wire 11 may take the form of a flat metallic strip. The trough 13 may be about 2" wide and 1" deep. Fig. 4 illustrates a horizontal cross-section of the tail fin and rudder and indicates the position of the conductor 11 and recess 13 filled with insulating material.

At the frequency at which the antenna is one quarter wavelength, the impedance at the fed point may be some 4,000 ohms, the impedance at higher and lower frequencies being lower than at the resonant frequency. By a suitable choice of matching unit, the antenna may be made to operate with acceptable efficiency over a substantial range of frequency. For a large aircraft, the dimensions of the tail fin may be such that satisfactory operation may be obtained with frequencies of the order of 2 mc./s.

The horizontal polar diagram of the antenna depends largely on the shape of the tail fin and on the location of the fed arm; the latter need not be brought down the side of the tail fin, but may be arranged in the leading edge (if the de-icing arrangements permit) or in the trailing edge, between the rear vertical edge of the tail plane and the rudder. In general, a substantially circular polar diagram in the horizontal plane may be readily realised. The alternative location of the conductor forming the fed arm between the rear vertical edge of the tail fin and the rudder is indicated at $11^1$ in Fig. 4 which indicates how the conductor may be housed in a suitable fairing $13^1$ of insulating material forming a rear edge to the tail fin. The conductor $11^1$ could form the actual edge of an insulating fairing.

Figures 5A, 5B:
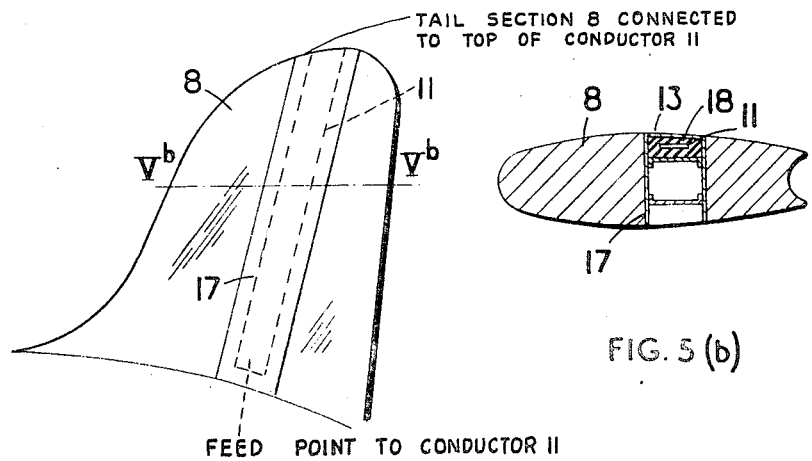
Fig. 5a is a diagrammatic elevation view of a tail fin of aircraft incorporating a further embodiment of the invention.
Fig. 5b is a diagrammatic cross sectional view of the tail fin shown in Fig. 5a taken through a horizontal plane containing the line $V^b$—$V^b$.

A convenient form of construction which may be employed when the fed arm is suppressed into the side of the tail fin is illustrated in Figs. 5a and 5b; this construction avoids the need, which may arise with the construction of Fig. 2, for weakening the skin-supporting rib members to provide depth for the slot 13 formed in the skin. As shown, the framework of the tail fin 8 may comprise a substantially vertical main girder 17, which, as indicated in Fig. 5b is of box-like cross section with the transverse flanges providing trough-shaped depressions which are normally covered by the skin surface of the fin. The space at one side of the girder may be employed as the trough 13 adapted to house the fed conductor 11 of the antenna by replacing the conducting skin between the flanges of the girder with a suitable di-electric covering 18. Alternatively, the entire trough formed between the girder flanges could be filled up with di-electric material, as indicated by the shading, in which is embedded the conductor 11.

Figure 3:
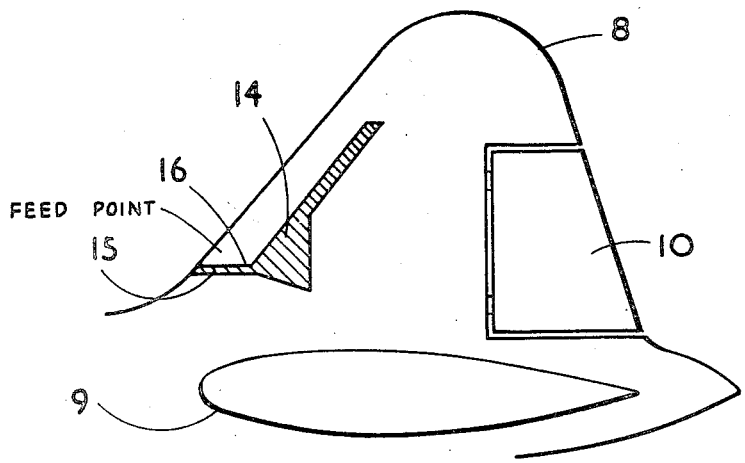
Fig. 3 is a diagrammatic elevation view of a tail portion of an aircraft incorporating another embodiment of the invention.

Fig. 3 illustrates one way in which the invention may be applied to a tail fin in which a metallic de-icing duct runs along the leading edge, below the skin, and in which a portion of the fin itself is employed as the fed arm of the aerial. Cuts are made in the skin, on both sides of the fin as shown by the shaded area 14, and an insert of an insulating material such as a suitable plastic is provided to replace the metal thus removed. The other side of the tail fin (not shown) is cut in a similar manner and a similar insert is provided. The insulating inserts, one on each side of the tail fin, thus form two finger-like salients lying substantially parallel to the edge of the tail fin and defining an elongated conductive region around the tail fin edge between them. It should be noted that the insulating inserts are brought out to the leading edge at 15, and a narrow break is made in the metallic de-icing duct at this point. A suitable feeder (not shown) is jointed to the point 16, and at frequencies at which the height of the tail fin is about one quarter wavelength or less, the antenna behaves as a folded unipole; the fed arm is that part of the tail fin which contains the de-icing duct, and the grounded arm is the upper part of the remainder of the fin.

The broadening at the base of the insulating insert has little effect on the behaviour of the antenna at frequencies of the order of those referred to in the preceding paragraph: but at substantially higher frequencies, the antenna is effectively a simple unipole formed by the lower half of the fed leading edge, terminated at its upper end by the high impedance of a short-circuited stub. By a suitable choice of dimensions, an antenna such as that of Fig. 3 may be made to have a useful efficiency over an exceptionally wide frequency range.

Figure 6:
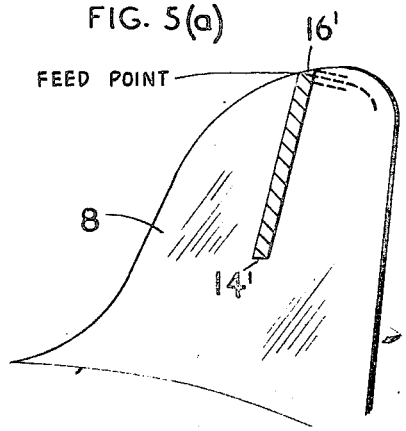
Fig. 6 is a diagrammatic elevation view of a tail fin of an aircraft incorporating a still further embodiment of the invention.

An alternative arrangement in which two portions of a tail fin are employed as the two elements of the folded unipole antenna without any interruption of the metallic leading edge of the fin being necessary, is illustrated in Fig. 6. Cuts are made in the skin on both sides of the fin 8, as shown by the shaded area $14^1$, and inserts of a suitable insulating material are used to replace the metal skin which has been removed. The interruptions in the conducting skin are so placed that the section of the fin forward of the cuts is smaller than the rearward section, and functions as the fed arm of the folded unipole, the remainder of the fin functioning as the grounded arm when a suitable unbalanced feeder is connected to the point $16^1$.

Figure 7:
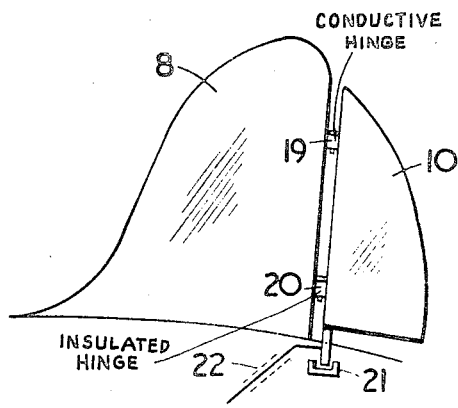
Fig. 7 is a diagrammatic elevation view of a tail fin and rudder portion of an aircraft constructed and fed as a folded unipole antenna in accordance with the invention.

A further type of embodiment of the invention in which two separate metallic portions of an aircraft structure are employed as the two elements of a folded unipole, is shown in Fig. 7 which illustrates arrangements in which the entire tail fin of an aircraft is used as the grounded member while the rudder assembly is used as the fed member. In Fig. 7 the rudder 10 is shown as being mounted with respect to the tail fin 8 by upper and lower hinges 19, 20 and a lower rudder post support 21. If the lower hinge 20 and support 21 are so insulated that the only conductive connection between the rudder and the fin and fuselage is through the upper hinge 19, then the rudder will operate as the fed arm of a folded unipole with respect to the grounded arm formed by the fin if a suitable unbalanced feeder connection is made to the lower portion of the rudder. This connection may conveniently be made to the rudder post by a feeder 22. An alternative feeding arrangement may be obtained with constructional simplification if the upper hinge 19 only is insulated and the rudder is excited by a feeder connected to the upper end of the rudder via the hinge 19.

It is to be understood that according to this invention, antennae may be formed at any suitably-shaped part of an aircraft structure, the application of the invention to tail fin antennae having been described by way of example only. In particular, embodiments such as those illustrated in Figs. 2–6 may be realised using portions of the wings or tail planes of aircraft, while embodiments utilizing separate but adjacent portions of the structure, such as that illustrated in Fig. 7, may be realised using other control surfaces such as elevators and ailerons.

I claim:

1. A folded unipole aircraft antenna system comprising a metallic portion of a projecting part of the aircraft structure forming the grounded arm of the folded unipole, a conducting element mounted within the aerodynamic outline of said projecting part of the aircraft structure and electrically connected to said metallic portion at one extremity to form the fed arm of the folded unipole, and means for connecting a radio frequency feeder to the other extremity of said conducting element.

2. A folded unipole aircraft antenna system comprising a metallic portion of a projecting part of the aircraft structure forming the ground leg of the folded unipole antenna, a conducting element mounted within the aerodynamic outline of said metallic portion, an electrical connection between one extremity of the conducting element and said portion, said portion and said element being in substantially parallel planes and forming legs of a U-shaped radiator, and means for connecting a radio frequency feeder to the other extremity of said conducting element.

3. A folded unipole aircraft antenna system comprising a metallic portion of a projecting part of the aircraft aerodynamic structure forming the grounded arm of a folded unipole antenna, said part defining an elongated recess therein, a conductor located in said recess in the surface of said projecting part and electrically connected thereto only at one extremity to form the fed arm of the folded unipole, and means for connecting a radio frequency feeder to the other extremity of said conductor.

4. A folded unipole aircraft antenna system comprising a metallic portion of a projecting part of the aircraft aerodynamic structure forming the grounded arm of a folded unipole antenna, said part defining an elongated depression therein, a conductor located in said depression and electrically connected at one extremity to the structure to form the fed arm of the folded unipole, means for connecting a radio frequency feeder to the other extremity of said conductor, and insulating material in said depression and separating said conductor from the structure, said insulating material being flush with adjacent parts of the aircraft, whereby the aerodynamic properties in the air-craft structure are the same as they would have been in the absence of the said antenna system.

5. A folded unipole aircraft antenna system comprising a metallic portion of the aircraft aerodynamic structure forming the grounded arm of a folded unipole antenna, said portion defining an elongated opening therein, a conductor located in said opening of the surface of the aircraft structure, an interior structural member constituting the internal boundary of the opening, said conductor being connected at one extremity to said member to form a fed arm of said folded unipole, means for connecting a radio frequency feeder to the other extremity of said conductor, and an insulating surface formed over the opening so as to effect predetermined smooth aerodynamic properties of the structure.

6. A folded unipole aircraft antenna system comprising a projecting portion of the aircraft, said projecting portion having a conductive surface, insulating material for dividing said portion into two parts, said parts meeting solely at one common boundary and being electrically united only at that common boundary to form the grounded and fed arms respectively of a folded unipole antenna, and means for connecting a radio frequency feeder to a point on the fed arm of said folded unipole remote from said common boundary.

7. A folded unipole aircraft antenna system as claimed in claim 6 wherein a boundary of the grounded arm of said folded unipole is electrically united to the main conductive structure of the aircraft.

8. A folded unipole aircraft antenna system comprising an aircraft tail fin having a surface comprising conductive and insulating regions, said surface including an elongated conductive region extending down one edge of the tail fin and electrically separated from a main conductive region by regions of insulating material except at one end, said elongated region being electrically united to the main conductive region at said end to form a folded unipole therewith, and means for connecting a radio frequency feeder to the end of said elongated conductive region remote from its union with the main conductive region.

9. A folded unipole aircraft antenna system as claimed in claim 8 wherein said tail fin surface comprises an insulating region extending around the said edge of the tail fin in the shape of two finger-like salients lying substantially parallel to said edge and reaching nearly to the extremity of said tail fin, to define said elongated conductive region between them.

10. A folded unipole aircraft antenna system comprising a metallic portion of a projecting part of an aircraft structure forming the grounded arm of a folded unipole antenna, a metallic control surface adjacent said projecting part and electrically connected thereto at one extremity of said control surface to form the fed arm of the folded unipole antenna, the opposing surfaces of said control surface and said projecting part being substantially parallel thereby forming a U-shaped radiator, and means for connecting a radio frequency feeder to the other extremity of said control surface.

11. A folded unipole aircraft antenna system comprising an aircraft tail fin having a metallic surface forming the grounded arm of a folded unipole antenna, a rudder mounted adjacent said tail fin and electrically connected at its extremity thereof to said metallic surface to form the fed arm of said folded unipole antenna, and means for connecting a radio frequency feeder to the other extremity of said rudder.

12. A folded unipole aircraft antenna system comprising an aircraft tail fin having a metallic surface forming the grounded arm of a folded unipole antenna, a rudder having a metallic surface hingedly connected to the tail fin and forming the fed arm of the folded unipole antenna, the hinge connection between said tail fin and said rudder comprising an upper hinge providing an electrically conductive connection between the metallic surfaces of said tail fin and said rudder, and a lower conductive bearing insulated from said tail fin, and means for connecting the lower end of the metallic surface of said rudder to a radio-frequency feeder.

13. A folded unipole aircraft antenna system comprising a metallic portion of an aircraft tail fin surface forming a grounded arm of a folded unipole antenna, said portion defining an elongated recess therein, a conductor located in said recess in the surface of said tail fin and electrically connected thereto at one extremity to form a fed arm of said folded unipole antenna, and means for connecting a radio frequency feeder to the other extremity of said conductor.

14. A folded unipole antenna system comprising a metallic portion of the surface of an aircraft tail fin forming a grounded arm of a folded unipole antenna, said portion defining an elongated depression, a conductor located in said depression in the conducting surface skin of the aircraft and electrically connected at one extremity to the metallic portion to form the fed arm of said folded unipole antenna, means for connecting a radio frequency feeder to the other extremity of said conductor, and a mass of insulating material surrounding said conductor and faired over the mouth of said depression as well as flush with adjacent parts of the tail fin so as to conform to the desired aerodynamic profile of the tail fin.

15. A folded unipole aircraft antenna system comprising a metallic portion of the surface of the aircraft tail fin forming the grounded arm of a folded unipole antenna, said fin defining an opening therein, a strip conductor located in said opening, an interior structural member constituting the internal boundary of said opening, said strip conductor being connected at one extremity to said metallic surface to form a fed arm of said folded unipole antenna, means for connecting a radio frequency feeder to the other extremity of said conductor, and insulating material filling the opening and being flush with adjacent parts of the aircraft structure.

16. An antenna system for an aircraft comprising a tail fin having a metallic skin, said skin being electrically bonded at the base of the tail fin to a metallic skin covering the main body of the aircraft to form the grounded arm of a folded unipole antenna, the metallic skin of said tail fin defining an elongated depression therein extending from adjacent the upper extremity of said tail fin towards the base thereof, a body of insulating material filling said depression, a wire embedded in said mass of insulating material, said wire being electrically connected to the skin of said tail fin at the upper extremity thereof to form the fed arm of said folded unipole antenna, and means for connecting the lower extremity of said wire to a radio frequency feeder.

17. An aircraft structure comprising a salient metallic member defining an elongated recess of small cross-section as compared to that of said member, insulating means filling said recess, an elongated conductor passing longitudinally in the recess and embedded in said insulating means, a connection between a first end of the conductor and said member to provide the sole connection between the conductor and said member, said conductor, connection and member being positioned to form a substantially U-shaped radiator, and a feeder for feeding the second end of said conductor.

18. An aircraft the structure of which is primarily metallic and which includes a metallic body and a salient metallic member electrically connected to the body of the aircraft, said member having an elongated extremity the first end of which extremity is closer to the body of the aircraft than the second end thereof, an elongated conductor connected at one end to said member and at a point on said member that is nearer the second end thereof than to the first end thereof, said conductor extending from said connection in closely spaced relation to a part of said extremity that is between said connection and said first end, and a radio frequency conductor connected to the other end of said conductor, said salient metallic member and said elongated conductor both being mounted within the aerodynamic outline of the aircraft.

19. An aircraft antenna for metallic aircraft comprising a U-shaped metallic radiator, one leg of the U being a part of the aerodynamic structure of the metallic aircraft, and a feeder for feeding the open end of the other leg of the U, the legs of the U being each substantially one-fourth wave-length long at operative frequency and being confined entirely within the aerodynamic outline of the aircraft.

20. An aircraft antenna as defined in claim 19 in which the U-shaped metallic radiator is included within the outline of a salient aerodynamic part of the aircraft that projects beyond and outside of the outline of the fuselage of the aircraft.

21. A folded unipole aircraft antenna system comprising a projecting portion of the aircraft, said projecting portion having a conductive surface, said surface having a slit therein for dividing the same into two parts which are electrically joined to each other at only one end of the slit thereby forming a U-shaped radiator with the legs of the U being the grounded and fed arms respectively of a folded uni-pole antenna, and means for connecting a radio frequency feeder to the fed arm of said folded unipole.

22. A folded uni-pole antenna system as defined in claim 21 wherein the free ends of the legs of the U are farther from the main conductive body of the aircraft than the juncture of the legs.

REX HENRY JOHN CARY.

REFERENCES CITED

The following references are of record in the file of this patent:

UNITED STATES PATENTS

| Number | Name | Date |
| --- | --- | --- |
| 2,235,139 | Bruce | Mar. 18, 1941 |
| 2,242,200 | Woods | May 13, 1941 |
| 2,414,266 | Lindenblad | Jan. 14, 1947 |
| 2,417,793 | Wehner | Mar. 18, 1947 |
| 2,431,124 | Kees | Nov. 18, 1947 |
| 2,463,547 | Meier | Mar. 8, 1949 |